Figure 1:
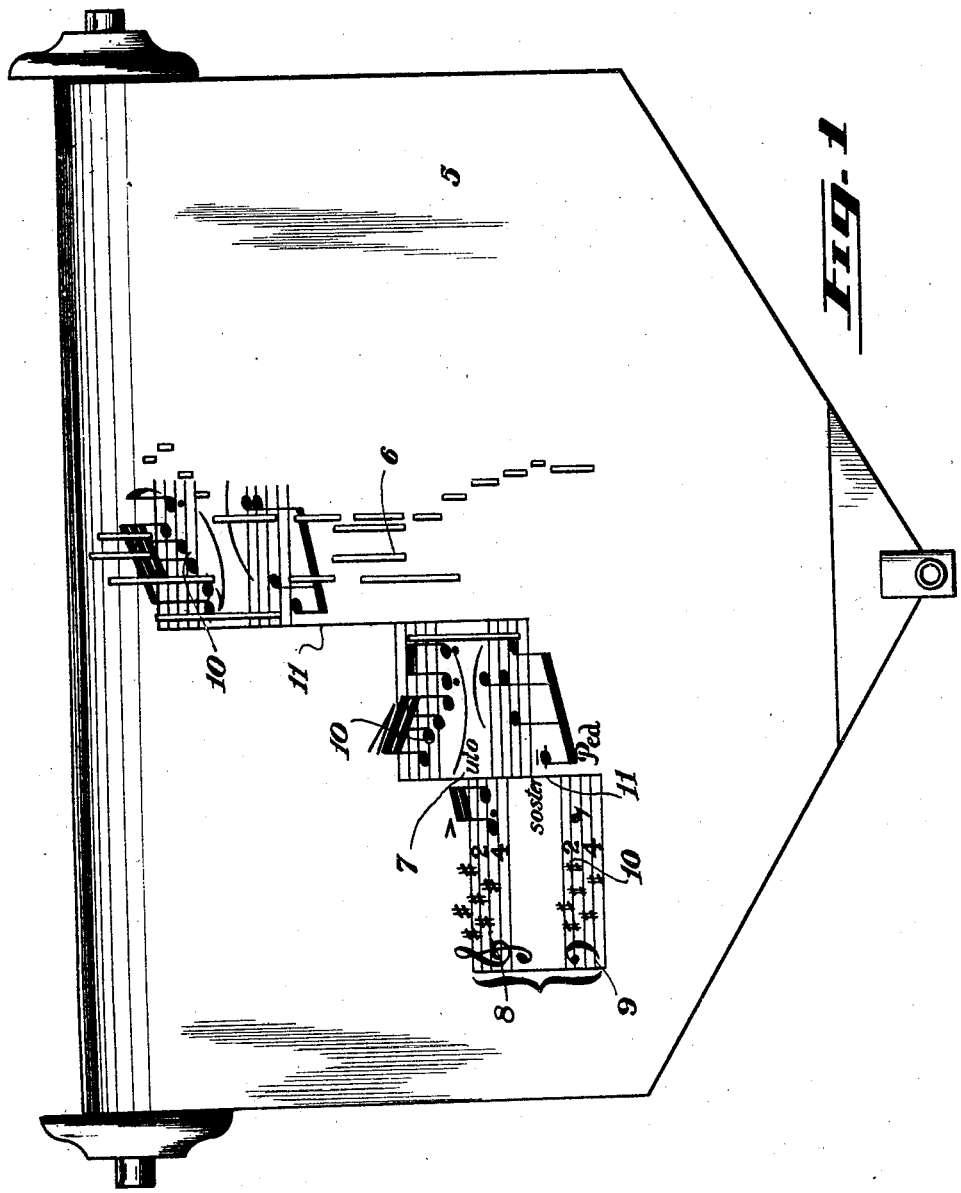

July 17, 1928.　　　　　O. FOSS　　　　　1,677,756
MUSIC ROLL FOR PLAYER PIANOS
Filed June 10, 1926　　　3 Sheets-Sheet 1

INVENTOR
Oscar Foss
By
Harold O. Penney,　　Attorney

July 17, 1928.

O. FOSS 1,677,756

MUSIC ROLL FOR PLAYER PIANOS

Filed June 10, 1926    3 Sheets-Sheet 2

INVENTOR
Oscar Foss

By Harold D. Penney
Attorney

July 17, 1928.
O. FOSS
1,677,756
MUSIC ROLL FOR PLAYER PIANOS
Filed June 10, 1926
3 Sheets-Sheet 3
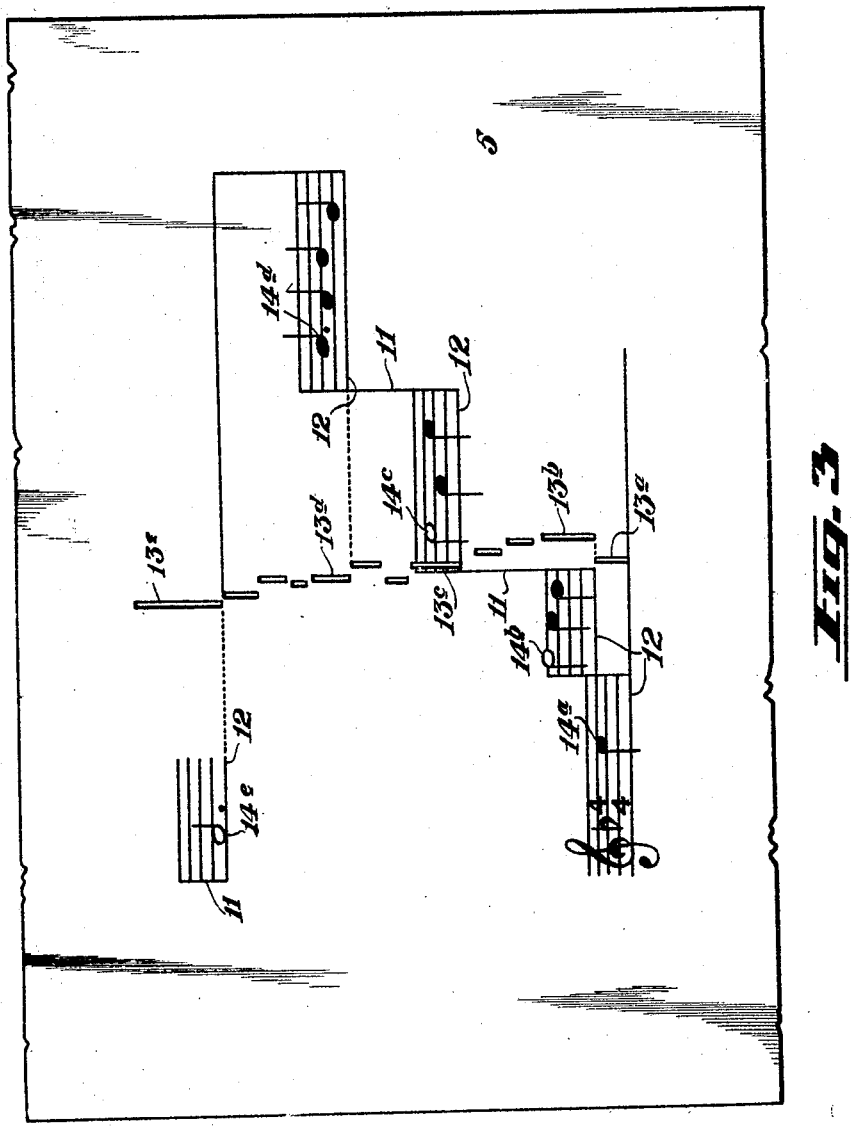
INVENTOR
Oscar Foss
Harold O. Penney, By
Attorney Patented July 17, 1928.

1,677,756

UNITED STATES PATENT OFFICE.

OSCAR FOSS, OF ANEROID, SASKATCHEWAN, CANADA.

MUSIC ROLL FOR PLAYER PIANOS.

Application filed June 10, 1926, Serial No. 115,036, and in Canada April 20, 1926.

This invention relates to improvements in a music roll for player pianos and appertains particularly to means for printing musical notations thereon whereby the same may be employed to facilitate teaching music or, by having orchestration or piano, violin or other accompaniment music thereon, would augment the usefulness of such rolls adapting them to be used as copy for orchestration or purposes of accompaniment as stated.

The principal object is to provide such a roll wherein printed music for vocal or instrumental accompaniment may be located and arranged thereon with respect to the perforations useable in mechanical reproduction so that the most synchronized music may be produced by facilitating the following of his music, by the musician, so that the sounding of the mechanical reproduction and the accompaniment may be substantially simultaneous.

A further object is to provide an improved roll wherein printed music may be so disposed on the roll as to be most readily associated with the perforations for mechanical reproduction, when used on a player piano, and to facilitate the reading of the music as it advances over the tracker bar, to which the printed music, as well as that being mechanically reproduced by the player piano, bears a predetermined relation; the printed music being stepped in horizontally disposed measures, longitudinally offset with respect to the roll a distance corresponding to the length of the roll consumed by the perforations represented by the notes in each measure, such stepped measures reading from left to right and returning to an aligned left hand margin after extending across the sheet, though stepped vertically, but with this difference that the lines will preferably be read from bottom to top successively in order that while reading the notes, the roll may be advanced over the tracker bar in the direction of the perforations, as intended for mechanical reproduction by the instrument.

A still further object is to provide a music roll for player pianos or the like on which is printed musical notations in horizontal lines, composed of fragments, each of one measure length, that are stepped or offset longitudinally of the roll so that the bar at the end of the first measure is lineally aligned with the bar at the beginning of the next measure, whether the second measure is stepped more than its depth or not, so that the stepped measures in the line of printed music read successively across the sheet, returning from the end at the left hand side to recommence at the right hand margin in alignment with the preceding line, the lower side of each measure of printed music beginning in horizontal alignment with the lowermost end of the perforation representing the first note in such measure, whereby the printed notations will always be displayed to view immediately above or in advance of the tracker bar simultaneously with the sounding of the corresponding notes being mechanically reproduced, to enable a singer or player to follow the words and music even more readily and to obviate the confusion of the vocalist or instrumentalist with relation to the syllablizing or measure of words or music and produce the best melody instead of requiring the musician to follow detached notes. This roll may be used either with or without perforations, the perforations being, of course, employed where the roll is to be used in, and the music mechanically reproduced by a player piano, in which case, the characters of the staff notations are printed across the areas occupied by the perforations, being of abnormal size if necessary to prevent obliteration by the perforated cuts; thus enabling a person to operate a mechanical musical instrument for the purpose of accompanying a singer or player of a musical instrument or for playing a song to follow the singer accurately in tempo and expression and to enable a person to sing or play a musical instrument directly from the musical sheet while it is being used on the mechanical instrument.

And a still further object of the invention is to provide a music roll as described that can be prepared without the customary perforations useable in mechanical reproduction thereby enabling the same to be better employed for instruction purposes when the piano music is not desired, yet enabling vocal and instrumental accompaniment to keep in perfect time, one with the other, by following the notations as they pass over the tracker bar.

To the accomplishment of these and related objects, as may become apparent, the invention resides in the construction, combination and arrangement of the several cooperating elements as shall be hereinafter more fully described, illustrated in the accompanying drawings and pointed out in the claims hereunto appended.

Figure 2:
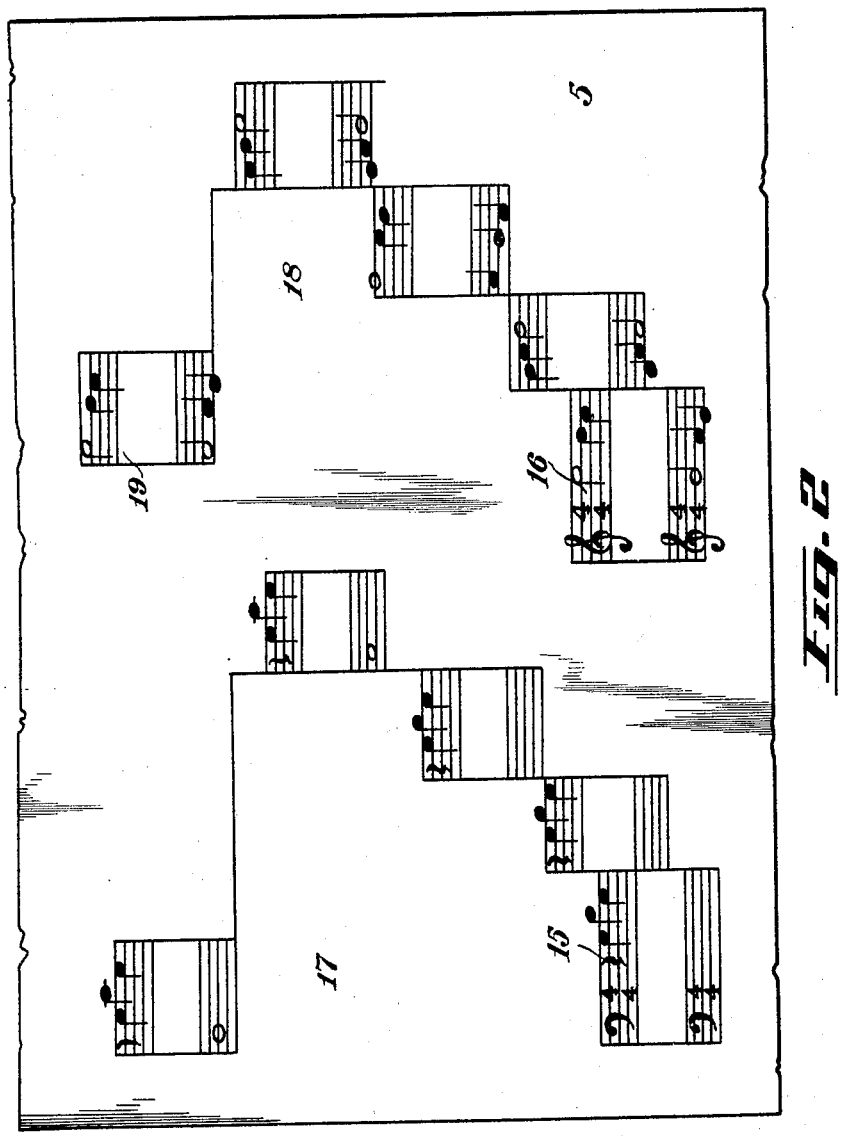

Reference is now had to the drawings, forming a part of this disclosure, wherein Fig. 1 is an elevation diagram of a perforated music roll of conventional design on which musical notations of treble and bass clefs are printed in accordance with this invention;

Fig. 2 is an illustration of a roll on which is printed both clefs of a musical exercise for use by the players of a duet; and Fig. 3 is a similar diagram of a perforated sheet bearing simple printed, musical notations showing the manner of stepping the measures.

In these drawings, wherein like characters of reference designate like parts throughout the several views the roll which is of the usual or any approved form for use in connection with player pianos or other instruments for mechanically reproducing music of this sort, is designated by the numeral 5.

In Fig. 1 this roll 5 is provided with perforations 6, adapted when used with a player piano to mechanically produce a musical exercise. The musical staff 7, these perforations represent and mechanically reproduce when in use, is printed across the face of the roll 5 being in both treble and bass clef as designated by the numerals 8 and 9 respectively, arranged in their usual relation. This printed musical staff 7 to compensate for the progressive movement of the roll 5 as it advances when in use on a player piano, is stepped by measures or bars 10 longitudinally and in the direction against the advance of the roll 5. To maintain a horizontal alignment with the perforations 6 producing the music being mechanically played, it is necessary to step some measures 10 of the printed staff 7 a greater distance than others, as in the drawing, a second measure in the printed staff shows a considerable vertical overlapping of the first measure while the third measure is stepped such a distance that it is clear of the second measure by quite an open space. Thus it will be seen that the vertical stepping of the measures may vary considerably but the line of printed music continues successively across the roll 5 unbroken in its continuity, except by this vertical stepping, for the bars 11 between adjoining measures, whether stepped great or little, are unbroken in their vertical alignment, being extended as necessary to unite the adjoining measures.

What is preferred as the truest and best manner of longitudinally advancing the measures 10 on the roll 5 to care for the progress thereof is clearly shown in Fig. 3 in which the roll 5 is shown as including perforations 6 and a simple staff 7 of printed music represented thereby. Here the line of printed music is stepped in measures 10 that continue across the sheet having the bars 11 on adjoining ends aligned, as previously described, but the bottom line 12 of the staff 7, in each stepped measure, is disposed substantially horizontal with the bottom or beginning of the perforation 13 represented by the first note 14 in such measure, as $13^a$, $13^b$, $13^c$, $13^d$ and $14^a$, $14^b$, $14^c$, $14^d$ respectively. So whether the printed staff is merely for the guidance of a singer, having associated therewith the words of a selection, or is intended for the observation of a student while mechanically playing the music, the better to connect the sound and symbol, or is the orchestration for violin or other musical instrument; the lower line of each measure of the printed staff, whether treble clef alone appears or treble and bass clefs are provided, is in horizontal alignment with the lower end of the perforation representing the first note in the measure so that the singer or player following the printed music knows exactly the time the player piano begins to mechanically produce the music of each measure and is enabled to keep in perfect time therewith. And further, as the notes in the mechanically reproduced music are sounded when the corresponding perforation passes over the tracker bar, the lower line in the staff of each measure of the printed music just reaches the tracker bar as the first note therein begins to sound, consequently the printed bar of music, which has advanced to the tracker bar by descending from the roller disposed thereabove, as is usual in conventional types of player pianos, is most readily and clearly visible, and has been so for a sufficient period for the musician who reads ahead of his playing, for the music roll, from the roller to the tracker bar, inclines forwardly and outwardly displaying the characters printed thereon.

For purposes of clarity, I have omitted perforations from the roll 5, illustrated in Fig. 2, for while it need not include any such means to permit of the production of music by mechanical means, it will be perfectly obvious that perforations adapting it for use on a player piano may be provided when and where desired and in the latter instance, i. e. when mechanically produced music is desired, the relation of the printed musical staffs to the perforations will be as previously described and illustrated in Figs. 1 and 3, in conjunction with which drawings this must be read.

As the music for orchestral instruments, duets and the like may be required on rolls of this type, the present form of arranging the printed staffs will be found best suited to the needs of the musicians especially in multipart playing. This invention provides a means of arranging the parts of the several players that will be most readily followed, avoid complication and conduce to the maintenance of perfect time on the part of a group of players. The staffs, of which there are two illustrated, a two-hand bass 15 and a two-hand treble 16, are arranged in lines extending across the roll being broken into measure-length fragments that are stepped longitudinally of the roll, as has been fully explained heretofore, but furthermore the copy of the bass and treble parts occupy individual portions of the roll in the form of longitudinal strips 17 and 18 respectively divided by the median line. The end of the lines of the bass clef 15 arranged on the left of the roll may extend to the median line and the first of the lines of the treble clef 16 commence at the median line, as shown at the beginning of the illustrated exercise; or a blank dividing margin, as provided by the laterally shifted measure 19 of the treble clef at the beginning of a line, may be supplied. This may be desired for, while with more complicated notations it may be necessary to enable the same to be easily followed, in a selection such as illustrated the openness of the printing and the lateral stepping of the measures would here allow of the aligning, on the median line, of the right hand end of the bass clef with the left hand end of the treble.

The several features of the invention have been illustrated and described separately, in part at least, for the purpose of most clearly describing them for, though severally and individually they are applicable to music rolls for player pianos, they combine, in an interdependent way to produce an improved roll that may be used in a manner otherwise impossible.

From the foregoing description taken in connection with the accompanying drawings, it will be manifest that a music roll for player pianos is provided which will fulfill all the necessary requirements of such a device, but as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

What I claim as new and desire to secure by Letters Patent is:

1. A music roll for player pianos having a musical staff printed thereon in transversely extending lines that are broken into measure-length fragments, stepped longitudinally of the roll against the direction of travel, the measures of each line continuing in unbroken succession transversely of the roll, the bars on adjoining ends of the measures being extended as necessary to compensate for the stepping thereof.

2. A music roll for player pianos having a musical exercise printed thereon and perforations, adapted when used in connection with a player piano to mechanically reproduce the said musical exercise printed thereon; said printed exercise extending continuously transversely of the sheet from margin to margin and stepped longitudinally of the roll in measure-length fragments, having the bars on aligned ends of adjoining measures extended to connect the same, the lines returning from the right hand end to recommence in alignment at the left hand margin, said measures being disposed longitudinally of the roll so that the bottom line of the staff is in horizontal alignment with the bottom of the perforation representing the first note in each respective measure.

In testimony whereof I hereunto affix my signature.

OSCAR FOSS.